United States Patent [19]

Stevens

[11] Patent Number: 5,259,324
[45] Date of Patent: Nov. 9, 1993

[54] GATE RETAINER

[75] Inventor: Wesley G. Stevens, Regina, Canada

[73] Assignee: Degelman Industries Ltd., Regina, Canada

[21] Appl. No.: 838,529

[22] Filed: Feb. 19, 1992

[51] Int. Cl.⁵ ............................................. B61D 7/00
[52] U.S. Cl. ............................. 105/308.1; 105/282.1
[58] Field of Search ............... 105/240, 282.1, 282.2, 105/282.3, 308.1, 310, 311.1, 311.2, 312, 313; 292/17, 76; 49/449

[56] References Cited

U.S. PATENT DOCUMENTS

| | | | |
|---|---|---|---|
| 803,396 | 10/1905 | Callan | 292/17 |
| 836,654 | 11/1906 | Schuyler | 292/76 |
| 960,445 | 6/1910 | Tupper | 292/76 |
| 1,068,886 | 7/1913 | Gamble | 292/76 |
| 2,072,292 | 3/1937 | Campbell | 105/282 |
| 2,112,698 | 3/1938 | Hull | 221/145 |
| 3,061,346 | 10/1962 | Jorgensen | 292/17 |
| 3,109,388 | 11/1963 | Dorey | 105/253 |
| 3,110,270 | 11/1963 | Ingram | 105/253 |
| 3,138,117 | 6/1964 | Dorey | 105/282 |
| 3,255,714 | 6/1966 | Dorey | 105/253 |
| 3,581,673 | 6/1971 | Denielson | 105/253 |
| 3,675,501 | 7/1972 | DeKanter | 73/358 |
| 3,780,672 | 12/1973 | Fuller | 105/253 |
| 3,865,046 | 2/1975 | Fuller | 105/253 |
| 3,933,100 | 1/1976 | Dugge | 105/282 P |
| 4,207,822 | 6/1980 | Zimmerle et al. | 105/253 |
| 4,248,158 | 2/1981 | Chierici et al. | 105/282 R |
| 4,324,188 | 4/1982 | Fritz | 105/282 R |
| 4,342,267 | 8/1982 | Blout | 105/282 P |
| 4,344,365 | 8/1982 | Fritz et al. | 105/282 A |
| 4,359,176 | 11/1982 | Johnson | 222/504 |
| 4,388,026 | 1/1983 | Green | 406/130 |
| 4,402,436 | 9/1983 | Hellgren | 222/561 |
| 4,428,504 | 1/1984 | Bessett et al. | 222/55 |
| 4,429,921 | 2/1984 | Fritz et al. | 308/3.5 |
| 4,450,773 | 5/1984 | Fritz et al. | 105/282 A |
| 4,475,072 | 10/1984 | Schwehr et al. | 318/602 |
| 4,534,292 | 8/1985 | Scott | 105/282.3 |
| 4,785,966 | 11/1988 | Waltke | 220/345 |
| 5,046,432 | 9/1991 | Bowler | 105/282.1 |

FOREIGN PATENT DOCUMENTS

| | | | |
|---|---|---|---|
| 0129231 | 12/1927 | Switzerland | 292/17 |
| 0009364 | 4/1913 | United Kingdom | 292/76 |

Primary Examiner—Mark T. Le
Attorney, Agent, or Firm—Robert H. Barrigar

[57] ABSTRACT

An improved retainer mechanism for retaining a gate relative to a frame has two spring bars and a pin. The spring bars may be attached to the frame. The pin may be attached to the gate. The spring bars are made of resilient material and each is shaped and mounted to the frame such that the free ends of the bars form a constriction between them. The width of the pin is greater than the width of the constriction. The space between the bars widens on either side of the constriction. The relative position of the gate, the pin and the bars is such that when the gate is closed, the flared free ends of the bars distally of the constriction between the bars constrains (excludes) the pin, retaining the gate in a closed position. The pin must move through the point of constriction, deflecting the bars apart, when the gate is moved towards an open position. In one embodiment, the invention is suited for use on the discharge chute gates of railway hopper cars. In an alternative embodiment, the bars are widely spaced from one another and the pin is replaced by two similarly widely spaced bar deflectors, one for each bar.

11 Claims, 2 Drawing Sheets

GATE RETAINER

FIELD OF THE INVENTION

This invention relates to a retainer mechanism for retaining one element relative to another, and especially, a movable gate relative to a frame supporting the gate. More particularly, the invention relates to a spring bar and pin arrangement whereby a constriction between the spring bars (which may be attached to the frame) forcibly constrains the pin (which may be attached to the gate), retaining the gate in a closed position.

BACKGROUND OF THE INVENTION

The requirement for a mechanism to retain a gate in either the closed or open position is an old one for which there are many solutions. Many retainers rely on the concerted action of A number of moving parts and the interdigitation of various elements with varying degrees of precision. Such systems are necessarily vulnerable to corrosion and fouling. These difficulties are most pronounced where the gate is bulky, the forces exerted on the gate are great, or the gate is found in an environment in which wear will be considerable. In these circumstances, a simple retainer which emphasizes reliability over elegance is usually preferable.

One of the most demanding applications for retainers is on the discharge chutes of railway hopper cars. An exemplary chute is described in U.S. Pat. No. 5,046,432 to Bowler (1991). In a typical arrangement, a frame is fastened to the underside of the hopper car. The frame encloses a gate which is permitted to slide longitudinally in the frame between the open and closed position. The weight of the material within the hopper car tends to press against the gate with great force. For that reason, the gate is ordinarily formed from steel. The gate is, therefore, usually quite heavy and also prone to corrosion. The gate retainer in the Bowler patent, a flat bar of spring steel, pressed against the back upper edge of the gate slide and tended to damage the finish on the top of the slide, promoting corrosion.

A variety of locking or retainer mechanisms have been emloyed on bulk material handling container gates. A pawl and plunger latching mechanism may be used to hold a shaft against rotation, as in U.S. Pat. No. 3,138,117 to Dorey (1964). An upright latch plate with a pivot mount may be arranged so that a finger enters a notch to lock the gate against sliding, as in U.S. Pat. No. 3,780,672 to Fuller (1971) and U.S. Pat. No. 3,865,046 to Fuller (1975). In a similar arrangement, locking tabs may be placed so as to engage corresponding notches in the slide gate, as in U.S. Pat. No. 4,785,966 to Waltke (1988). Or, a locking dog can be positioned to rotate into place behind the sliding gate, as in U.S. Pat. No. 3,255,714 to Dorey (1966). These retaining mechanisms all depend on moving parts and the interdigitation of various elements. As a result, corrosion and fouling with dirt or other material may interfere with their effectiveness. In addition, these retainers typically require an operator to actively engage their various mechanisms. This can be awkward and indeed dangerous to the operator.

SUMMARY OF THE INVENTION

Accordingly, several objects and advantages of the present invention follow from its lack of moving parts and the overall simplicity of its design. In particular, there are no hinges which could corrode and jam. The mechanism functions automatically with the movement of the gate. No separate action is required on the part of an operator in order to engage the retainer of the present invention. There is no requirement for the interdigitation of parts with any substantial degree of precision. There are, for example, no slots into which plates must fit nor any carefully dimensioned receptacles for accommodating moving pins. As a result, the components of the present invention may be constructed with emphasis given to sturdy reliability rather than detailed precision. In addition, the components of the present invention may, by their nature, easily be added to many existing gates. Still further objects and advantages will become apparent from a consideration of the ensuing description and drawings.

In accordance with the invention, a retainer mechanism for retaining a gate relative to a frame, comprises two opposed shaped spring bar elements and a bar deflector such as a pin typically made of steel. (Herein the term "frame" is used in a very general sense, and may be, for example, the side or bottom plate of a hopper or other enclosure.) The spring bar elements are made of resilient material, which may be steel, and they are preferably mounted to the frame. The bars are mounted and shaped such that the free end of the two bars form a constriction between them, and the space between the bars widens on either side of the constriction. The bar deflector (pin) is preferably mounted to, and protrudes from, the gate. Alternatively, the pin could be mounted to the frame and the spring bars to the gate, but this construction is usually more inconvenient to arrange than the preferred arrangement herein described. The pin is positioned on the gate such that closing movement of the gate causes the pin to travel toward and then through the line of constriction (the line of minimum distance between the bars, at a portion of which the shaped bars form a constriction). The pin is of sufficient cross-sectional size that it deflects the spring bars apart when it moves through the point of constriction between the bars. The bars, pin and constriction are so dimensioned and positioned that once the pin, moving distally toward the free ends of the bars, passes the constriction, the gate is thereupon fully closed.

The pin is mounted to the gate and the spring bars to the frame in corresponding position so that the pin rests against opposed flared pin-retaining faces of the bars flaring distally outwardly from the area of constriction between the bars, when the gate is in the fully closed position. The positional relationship of the pin to the bars is such that the pin must move proximally through the line of constriction, thereby deflecting the bars apart, when the gate is moved towards an open position. Accordingly, the gate is kept in the closed position by the contact between the pin and the distal portion(s) of the bar(s) forming the flared portion thereof just distally of the constriction between the bars. The arrangement may be such that only one bar is outwardly flared, but a more secure retention results from flaring both bars outwardly distally of the constriction, and this is preferred.

(The terms "proximal" and "distal" are used relative to the mounting positions of the spring bars).

In one embodiment, the bars are relatively closely spaced and at the point of constriction may be touching or almost touching. In this case, the bar deflector may be a unitary element such as a pin whose diameter is greater than the distance between the bars at the line of constriction.

In an alternative embodiment, the bars are widely spaced. For example, they may be mounted to opposed sides of the frame, or close to the opposed sides on a transverse frame element. In such case, the bar deflector is conveniently formed as two separate elements, each deflecting a discrete one of the bars. Each element would then be mounted in the path of travel of the associated bar so as to intersect that portion of the bar at the line of constriction as the constricted portion and bar deflector element approach one another, thereby causing deflection of the bar when the constricted portion comes into contact with the bar deflector (moving along its path of travel). It is of course a matter of design choice whether the bar moves while the bar deflector remains fixed in position, or vice versa, but conveniently the bar deflectors are mounted on the slidable gate while the bars are mounted to the frame supporting the gate. This particular embodiment works well for a sliding gate arrangement, but is less satisfactory for a swinging arrangement.

Note that whichever embodiment is chosen, the line of contact or the tangent to the point of contact between the bar deflector and bar when the gate is closed should be at an appreciable angle to the direction of travel of the gate, and the shaping of bar deflector and bar in the vicinity of the point of contact should be such that an appreciable retaining force will immediately resist any motion of the gate away from its closed position to an open position. In other words, a deliberate application of substantial gate-opening force should be required to overcome the retaining force offered by the bar deflectors to the bars. What is sufficient force will depend upon the particular situation—the mass of the gate, the load bearing against the face of the gate, etc. The line of contact or tangent to the point of contact between the bar deflector and bar when the gate is closed should not be perpendicular to the path of travel of the gate, because then, when force in the direction of the path of travel of the gate is applied to open the gate, no component of that force would be available to deflect the bars transversely so as to permit the gate to open. So the angle of such line of contact (or tangent to the point of contact) relative to the path of travel of the gate should be appreciably less than 90°. These two constraints suggest that such line of contact should usually desirably be between about 30° and about 60° to the path of travel of the gate. The design choice will depend in part upon the stiffness of the bars, the geometry of the arrangement, the various loading forces, etc.

Note also that there are different constraints upon the shaping, geometry, angle of contact etc. of the bar deflector (s) and bars on the "gate open" faces of the bars and bar deflectors. Conveniently, the angle of contact of these elements during their contact when the gate is moving from open to closed position, relative to the path of travel of the gate, is a relatively small angle, so that relatively little force in the "gate-closing" direction of travel will deflect the bars apart and permit the bar deflectors easily to reach the line of constriction of the bars and pass that line into the "gate closed" gate-retaining position.

Conveniently the bars are of appreciable length between the line of constriction and their point of mounting, so as to facilitate deflection. Conveniently the bars terminate at their free ends just past the line of constriction, so as not to occupy space unnecessarily nor use more material than necessary.

The gate or pin and the distal end of at least one of the spring bars may each be provided with apertures. These apertures are of sufficient diameter and are so oriented so as to allow the passage of a wire through them. A wire passed through the spring bar and gate in this way can be tied to provide an extra measure of security against unwanted opening of the gate from its closed position, in that the gate cannot be opened without breaking the wire.

As mentioned, the gate may be slidable, in which case movement of the gate causes the pin to travel along a line which intersects the line of constriction between the shaped bars. Sliding may be by means of a roller mechanism or by any other means of achieving displacement of the gate. In one such embodiment, the gate is a generally horizontal plate for selectively opening and closing a hopper discharge chute, such as is found on railway hopper cars, and the pin protrudes vertically from the gate. The spring bars are then positioned to constrain the pin distally when the gate is fully closed. Alternatively, the pin may protrude horizontally outwards from a side of the gate, said side being generally parallel to the direction of gate travel. In other words, the side bearing the pin is on neither the leading nor trailing edge of the gate, but on one of the other edges which is at least roughly in line with the direction of gate travel.

Two or more gate-retaining bar and pin arrangements, each of the type previously described, may be spaced along the frame and gate to distribute the deflection and retaining forces over two or more such assemblies.

While the specific application herein described is for a gate, the retainer mechanism herein described could be used wherever it is desired to secure one element in position relative to another element, the two elements being capable of relative displacement.

DETAILED DESCRIPTION WITH REFERENCE TO THE DRAWINGS

Figure 1:
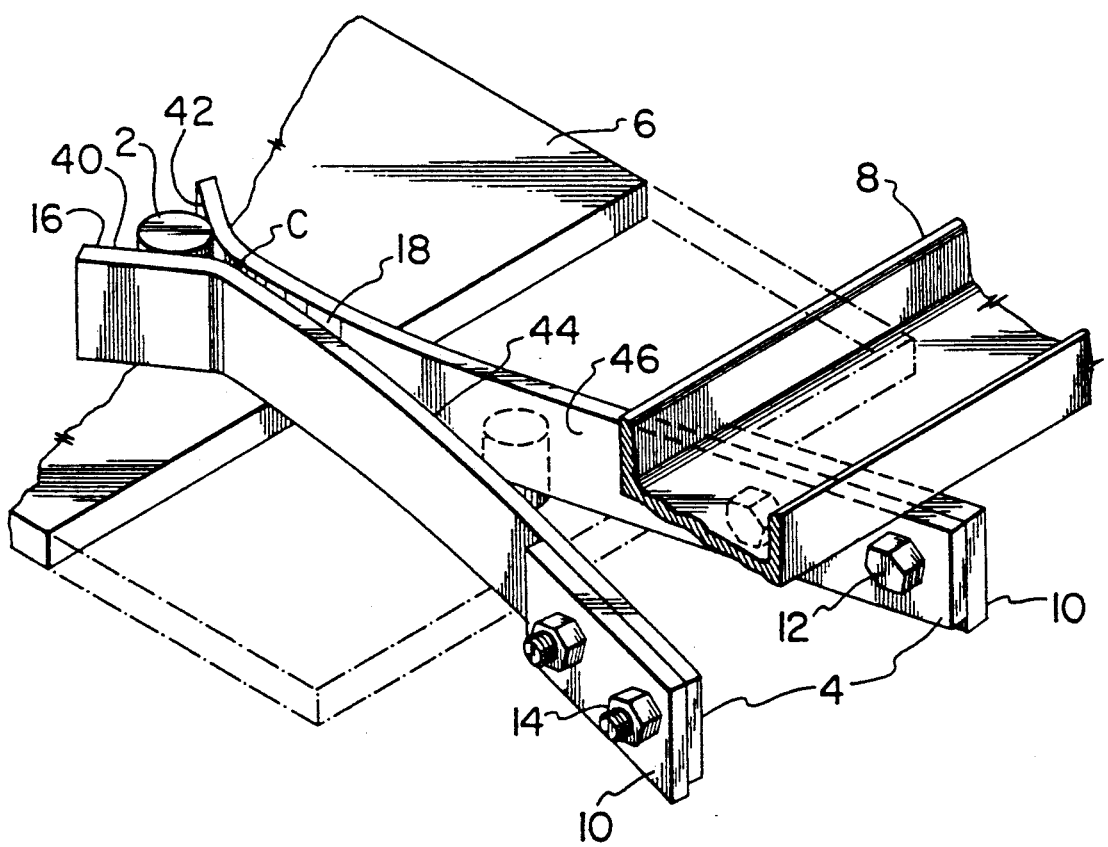
FIG. 1 is an isometric underside view of an embodiment of a pin-and-spring-bars gate retainer assembly constructed in accordance with the principles of this invention.

With reference to FIG. 1, a gate 6 for a hopper or the like is mounted for sliding movement relative to a frame 8. Only portions of the gate 6 and frame 8 are illustrated in FIG. 1. We see in FIG. 1 the underside of the gate arrangement—it is desirable to mount the retainer mechanism underneath the gate so that it is out of the weather and out of normal reach of workers who might inadvertently damage the mechanism. The gate 6 is shown in its fully closed position in solid lines and in its open position in phantom lines. (The area of gate opening is not shown—it would be to the upper left of and outside the drawing). Two shaped spring bar elements 4 are identically shaped and oppositely symmetrically mounted to the frame 8 such that the free (distal) ends of the bars 4 form a constriction C and widen on either side of the constriction C so as to form a distally flared configuration 16 and a proximally tapered configuration 18 of the bars 4. The distally flared configuration 16 is formed by opposed flared pin-retaining faces 40, 42 located distally of the constriction C. The proximally tapered configuration 18 is formed by opposed tapered bearing faces 44, 46 located proximally of the constriction C. Because, as previously mentioned, the terms "distally" and "proximally" are tested relative to the mounting position of the spring bars 4, it follows that the pin-retaining faces 40, 42 located distally of the constriction C are more remote from such mounting position than are the tapered bearing faces 44, 46 which are located proximally of the constriction C. Note that the angle of taper of configuration 18 relative to the path of travel of pin 2 (to be described next) along the line of constriction can and preferably should be more gentle than the angle of flaring of configuration 16 relative to the path of travel of the pin 2, to be described next.

A pin 2 is mounted to, and protrudes upwardly from, the gate 6, such that sliding movement of the gate 6 causes the pin 2 to travel through the constriction C formed by the shaped bars 4, the pin 2 being of sufficient cross-sectional size that it deflects the spring bars 4 apart when it moves through constriction C. (The line of constriction is the line passing through constriction C perpendicular to the faces of the bars 4 at the constriction C and perpendicular to the path of sliding movement of the gate 6.)

The pin 2 is mounted to the gate 6 and the spring bars 4 to the frame 8 in corresponding mating position so that the pin 2 rests against and engages the distal pin-retaining faces 40, 42 of the bars 4 at flared configuration 16 just distally beyond constriction C when the gate 6 is in the fully closed position (solid lines).

The pin 2 moves through the point of constriction C, deflecting the bars 4 apart, when the gate 6 is moved towards an open position (phantom lines). The resistance of the spring bars 4 to deflection accounts for the constraint of pin 2, and maintains the gate 6 in closed position. This resistance must be overcome by deliberate application of a gate-opening force applied in the gate-opening direction of movement of the gate 6, in order for the gate 6 to open. Because of the geometry of the arrangement, the applied gate-opening force has force components that deflect the distal flared ends 16 of the bars 4 transversely outwardly, forcing them apart and permitting the pin 2 to pass through and beyond the constriction C into a "gate-open" position.

The relatively gentle angle of taper of bearing faces 44, 46 relative to the path of travel of the pin, as compared with the relatively abruptly flared pin-retaining faces 40, 42 which make a much more pronounced angle of taper relative to the path of travel of pin 2, facilitates passage of the pin 2 between the spring bars 4 and offers only limited resistance to the closure of the gate. On the other hand, since the angle of flaring of the pin-retaining faces 40, 42, relative to the path of travel of the pin 2 is much more pronounced, the pin does not move easily from its gate-closed engagement with faces 40, 42—a fairly substantial force is required to force the pin proximally into the constriction C and to pass through the constriction, thereby permitting the gate to open.

Spring bars 4 are mounted to frame 8 by attachment to flanges 10 which are welded to the frame 8. Nuts 14 and bolts 12 attach the bars 4 to the flanges 10.

Figure 2:
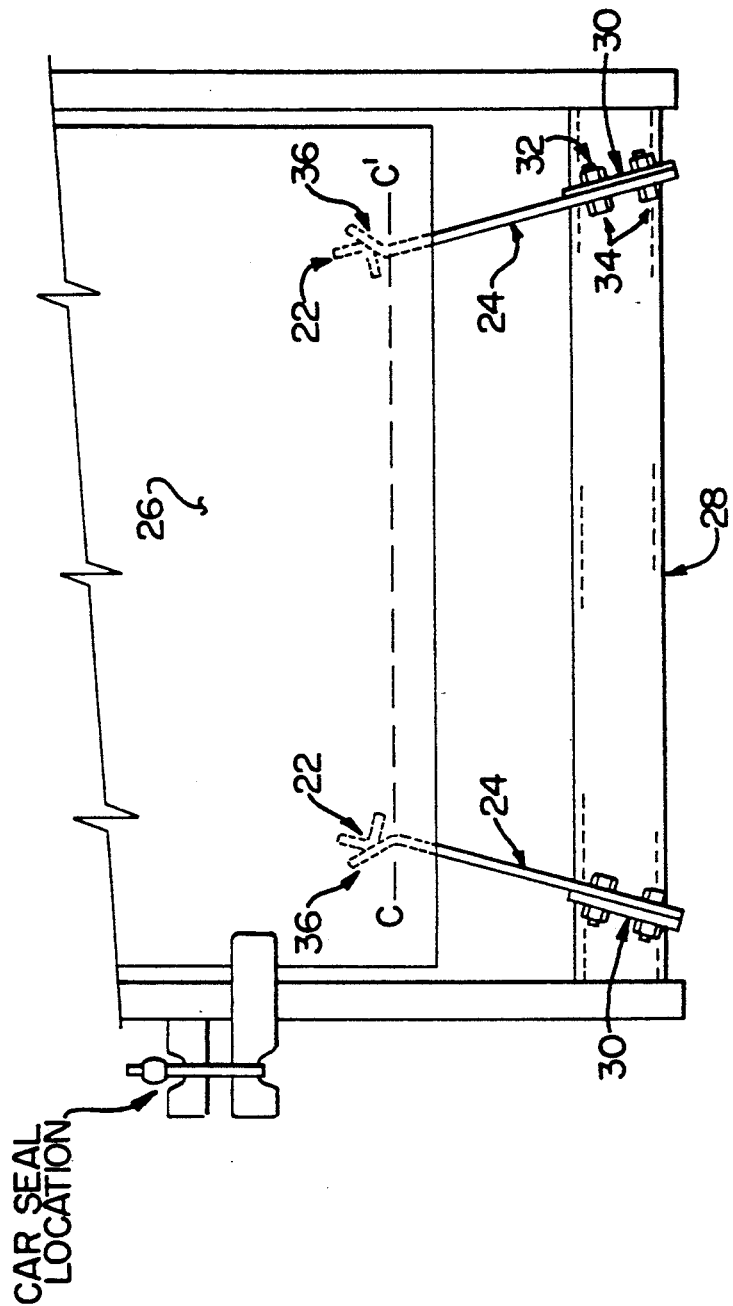
FIG. 2 is a plan view of an alternative embodiment of a spring-bars-and-bar-deflector gate retainer assembly, according to the invention.

An alternative gate-retaining arrangement is shown in FIG. 2. Here we are viewing the arrangement in plan view from above. Again a gate 26 is slidably mounted relative to a frame 28. Spring bars 24 are spaced widely apart from one another, mounted on the frame 28 by means of flanges 30 welded to frame 28 and nuts 32 and bolts 34, the latter passing through mating holes in the flanges 30 and the proximal ends of spring bars 24.

Note that the spring bars 24 are symmetrically opposed in the transverse sense, and a line of constriction C-C' (shown as a broken line) is defined as lying along the shortest distance between opposed faces of bars 24. Again, as in FIG. 1, bars 24 are flared outwardly both distally and proximally on either side of the line of constriction C-C'.

While a single bar deflector could still be used in the FIG. 2 arrangement, it would have to be wider than the distance between the bars 24 along the line of constriction C'C'. More conveniently, two spaced bar deflectors in the form of bevelled angle sections 22 are each fixed to the gate 26 so that when the gate 26 is fully closed, the convex curved faces of bar deflectors 22 are in contact with distally flared deflector-retaining portions 36 of spring bars 24. The geometry is such that the gate-closing, gate-opening and gate-retaining forces are entirely comparable to those that apply to the FIG. 1 arrangement.

While a sliding gate has been illustrated, the retaining device at least of FIG. 1 can be used for swinging gates; what is required is that a pin move distally through a constriction to reach, in fully closed position of the elements to be retained, a position just beyond the constriction distally thereof, in which position the pin engages a flared portion of the bars distally of the constriction, and must deflect the bars in order to move proximally.

Note that the pin and bars could be interchangeably mounted, the pin to the frame, the bars to the gate. This is true of both the FIG. 1 and FIG. 2 arrangements.

One of the spring bars could be shaped differently from the other. One could, for example, be straight, and could be formed as a rigid portion of the frame (or, if the mountings were interchanged, the gate). What is required is that there be a flared portion of the bars just distally of the pin (or other bar deflector) when the gate is fully closed. In the limiting case, the flared portion could be formed by one bar only. However, this is not as desirable as the preferred embodiments illustrated, in which the gate-retaining force against the pin or bar deflectors (in the event that the gate is trying to open) is borne by both bars approximately equally ((assuming the pin (say) to be centred)).

Note that the bars could be continuously curved and mounted convex-inwards to form a constriction and to form flared portions on each side of the constriction.

The gate-securing mechanism herein described is intended to be a retainer but not a seal or lock. A conventional gate seal may be employed as required. For example, in FIG. 2 is shown a conventional car seal/lock arrangement 38 at one side of the gate.

Further refinements, modifications and variants will readily occur to those skilled in the art without departing from the principles of the invention set forth in the appended claims.

What is claimed is:

1. A retainer mechanism for retaining a gate in closed position relative to a frame in which the gate is slidingly mounted for sliding movement between open and closed positions, comprising:

a pin mounted to and protruding from the gate; and a pair of opposed spring bars each having a proximal end thereof mounted to the frame at a respective mounting position;

the spring bars having free distal ends forming a constriction therebetween, and configured to form opposed flared pin-retaining faces distally of the constriction and to form opposed tapered bearing faces proximally of the constriction, wherein the pin-retaining faces are more remote from the mounting positions of the spring bars than are the tapered bearing faces;

the pin and the spring bars being mounted in mating positions so that the path of travel of the pin as the gate is opened and closed lies between the spring bars;

the pin being wider than the constriction in rest position thereof and constrained in a gate-closed rest position in engagement with the pin-retaining faces of the spring bars when the gate is closed;

the pin moving from a proximal gate-open position relative to the mounting positions of the spring bars toward the constriction and engaging the tapered bearing faces of the spring bars thereby forcing apart the spring bars so that the pin passes through the constriction to its gate-closed rest position when the gate moves from an open to a closed position.

2. A retainer mechanism as defined in claim 1, located on the underside of the gate, the gate being mounted generally horizontally to the frame.

3. A retainer mechanism as defined in claim 1, wherein the gate is a plate for selectably opening and closing a hopper discharge chute, and the pin protrudes generally perpendicularly from the plate relative to the frame.

4. A retainer mechanism as defined in claim 1, wherein the gate is a plate for selectably opening and closing a hopper discharge chute, and the pin protrudes outwards from a side of the plate, said side being generally parallel to the direction of plate travel.

5. A retainer mechanism for retaining a gate in closed position relative to a frame in which the gate is slidingly mounted for sliding movement between open and closed positions, comprising:

bar deflector means mounted to and protruding from the gate; and a pair of opposed spring bars each having a proximal end thereof mounted to the frame at a respective mounting position;

the spring bars having free distal ends forming a constriction therebetween, and configured to form opposed flared deflector-retaining faces distally of the constriction and to form opposed tapered bearing faces proximally of the constriction, wherein the deflector-retaining faces are more remote from the mounting positions of the spring bars than are the tapered bearing faces;

the bar deflector means and the spring bars being mounted in mating positions so that the path of travel of the bar deflector means as the gate is opened and closed lies between the spring bars;

the bar deflector means being wider than the constriction in rest position thereof and constrained in a gate-closed rest position in engagement with the deflector-retaining faces of the spring bars when the gate is closed;

the bar deflector means moving from a proximal gate-open position relative to the mounting positions of the spring bars toward the constriction and engaging the tapered bearing faces of the spring bars thereby forcing apart the spring bars so that the bar deflector means passes through the constriction to its gate-closed rest position when the gate moves from an open to a closed position.

6. A retainer mechanism as defined in claim 5 wherein the bar deflector means comprises a pair of bar deflecting elements spaced transversely from one another relative to the path of travel of the gate, each said element engaging a discrete one of said deflector-retaining faces when the gate is closed.

7. A retainer mechanism as defined in claim 6, located on the underside of the gate, the gate being mounted generally horizontally to the frame.

8. A retainer mechanism as defined in claim 6, wherein the gate is a plate for selectably opening and closing a hopper discharge chute, and the bar deflector elements protrude generally perpendicularly from the plate relative to the frame.

9. A retainer mechanism as defined in claim 6, wherein the gate is a plate for selectably opening and closing a hopper discharge chute, and the bar deflector elements protrude outwards from a side of the plate, said side being generally parallel to the direction of plate travel.

10. A retainer mechanism as defined in claim 6, wherein the spring bars are symmetrically shaped and mounted relative to the path of travel of the bar deflector elements.

11. A retainer mechanism as defined in claim 6, wherein the angle of flaring of the flared deflector-retaining faces of the spring bars relative to the path of travel of the bar deflector elements exceeds the angle of tapering of the tapered bearing faces of the spring bars relative to the path of travel of the bar deflector elements.

* * * * *